United States Patent [19]
Schreiter et al.

[11] Patent Number: 5,090,767
[45] Date of Patent: Feb. 25, 1992

[54] SLIDING ROOF AND/OR SLIDING AND TILTING ROOF FOR MOTOR VEHICLES

[75] Inventors: Thomas Schreiter; Arpad Fuerst, both of Munich; Werner Paetz, Freising, all of Fed. Rep. of Germany

[73] Assignee: Webasto AG Fahrzeugtechnik, Stockdorf, Fed. Rep. of Germany

[21] Appl. No.: 645,794

[22] Filed: Jan. 25, 1991

[30] Foreign Application Priority Data

Jan. 26, 1990 [DE] Fed. Rep. of Germany ....... 4002278

[51] Int. Cl.$^5$ .............................................. B60J 7/05
[52] U.S. Cl. .................................. 296/216; 296/217; 296/221; 296/224
[58] Field of Search ............... 296/217, 221, 222, 224, 296/216; 16/82, 85

[56] References Cited

U.S. PATENT DOCUMENTS

| | | | |
|---|---|---|---|
| 1,326,841 | 12/1919 | Bousquet | 16/82 X |
| 1,459,949 | 6/1923 | Dorl | 16/82 X |
| 1,543,912 | 6/1925 | Gammeter | 16/82 |
| 1,588,477 | 6/1926 | Kingston | 16/82 |
| 1,619,067 | 3/1927 | Gammeter | 16/82 |
| 1,657,528 | 1/1928 | Eastman | 16/82 |
| 1,678,499 | 7/1928 | Eastman | 16/82 |
| 1,746,961 | 2/1930 | Palmer | 16/82 |
| 1,752,423 | 4/1930 | Eastman | 16/82 |
| 2,295,496 | 9/1942 | Cameron | 16/82 X |
| 2,608,711 | 9/1952 | Moore | 16/82 |
| 3,517,408 | 6/1970 | Banse | 16/85 X |
| 4,342,482 | 8/1982 | Koral et al. | 296/221 |
| 4,363,515 | 12/1982 | Lutz et al. | 296/222 |
| 4,725,092 | 2/1988 | Reintges et al. | 296/221 |
| 4,732,422 | 3/1988 | Schlapp et al. | 296/221 |

FOREIGN PATENT DOCUMENTS

| | | | |
|---|---|---|---|
| 0194804 | 9/1986 | European Pat. Off. | 296/221 |
| 8107603 | 7/1981 | Fed. Rep. of Germany | 296/221 |
| 2940565 | 7/1984 | Fed. Rep. of Germany | |
| 3419900 | 11/1985 | Fed. Rep. of Germany | 296/217 |
| 3535126 | 12/1986 | Fed. Rep. of Germany | |
| 3641033 | 6/1988 | Fed. Rep. of Germany | 296/217 |
| 2133460 | 7/1984 | United Kingdom | 296/221 |

Primary Examiner—Dennis H. Pedder
Attorney, Agent, or Firm—Sixbey, Friedman, Leedom & Ferguson

[57] ABSTRACT

A sliding roof and/or a sliding lifting roof and/or a lifting sliding roof for motor vehicles has a safety device for preventing detachment from the motor vehicle of the cover which is displaceable for closing and at least partially unblocking a roof opening and which optionally can also be vented. The safety device has at least one flexible safety element, which is connected to the cover and at least indirectly to a part which is integral with the body of the motor vehicle. The flexible safety element can be designed as a catch band or catch cloth, and with the design as a catch cloth it can, at the same time, serve as a making screen. Further the flexible safety element can be physically or operatively connected to the sliding device and/or the vent device. This means at least one end of the flexible safety element can be movably guided, optionally in separate channels, on the guide rail which is fastened to the roof frame. Also, the safety element can, for example, be integrated within the vent lever and can be provided in it in the form of a cast steel rope.

15 Claims, 7 Drawing Sheets

SLIDING ROOF AND/OR SLIDING AND TILTING ROOF FOR MOTOR VEHICLES

BACKGROUND OF THE INVENTION

The invention relates to a sliding roof and/or a sliding and tilting roof for motor vehicles having a rigid cover closing or at least partially exposing a roof opening as well as optionally, being able to be vented. In particular, the invention relates to such a roof where the cover is guided on a guide rail by a sliding device and, optionally, by a vent device, and where a safety device for protecting against detachment of the cover from the motor vehicle is provided.

A sliding roof for a motor vehicle of the above-noted type is known from U.S. Pat. No. 4,363,515. To keep the cover from moving independently in the closing direction, especially during the occurrence of sudden, high deceleration forces, such as in an impact of the motor vehicle, an impact safety device serves to prevent an unintentional closing of the at least partially open cover. In one embodiment of the disclosed impact safety device, an automatic safety belt extends between the cover and the fixed roof part for this purpose.

A sliding roof for motor vehicle is known from German Patent 35 35 126, in which the cover is secured against pulling out of the roof opening as a result of great lifting forces acting on it at extremely high vehicle speeds. In this case, a positive connection is provided, in which a sealing section, fastened irremovably on the cover by a holding frame, engages under a edge of the vehicle roof.

Despite these known embodiments of the sliding roofs for motor vehicles, still as before, there is the danger that, in case of an accident, the cover can come loose from the vehicle. If the cover has come loose from the vehicle, it can fly through the air, and as a result, can cause bodily injuries and/or property damage in the vicinity of the vehicle. Further, there is the danger that passengers in the vehicle, who do not wear seat belts, will be thrown through the exposed roof opening, if the cover comes loose from the vehicle. To prevent such a detachment of the cover from the vehicle, it would, of course, be possible to design and dimension the sliding device and/or the vent device of the sliding roof and/or the sliding and tilting roof so that the cover cannot come loose from the vehicle in case of an impact or an accident. However, in this case, structural dimensions for the sliding device and/or the vent device result, which are incompatible with respect to the requirements for achieving as flat as possible construction of the sliding roof and/or sliding and tilting roof.

SUMMARY OF THE INVENTION

In view of the foregoing, the invention, therefore, aims at providing a sliding roof and/or sliding and tilting roof for motor vehicles which overcomes the difficulties described above, and in which the cover is reliably secured against pulling out from the roof opening in the motor vehicle while still allowing the sliding roof and/or sliding and tilting roof to have a shallow design.

According to various preferred embodiments of the invention, for this purpose, a sliding roof and/or a sliding and tilting roof for motor vehicles having a rigid cover that is displaceable from a position closing a roof opening to at least one position in which the roof opening is at least partially unblocked, or optionally, vented, and which is guided on a guide rail by a sliding device and optionally by a vent device, is provided with a safety device for preventing detachment of the cover from the motor vehicle, and this safety device has at least one flexible safety element, which is connected to the cover and directly or indirectly to a part which is integral with the motor vehicle.

With this design of the motor vehicle roof according to preferred embodiments of the invention the sliding device and/or vent device can be dimensioned so as to reliably perform their functions. Safety aspects need not be considered in the design and/or dimensioning of the sliding device and/or vent device so that these devices can be designed to enable a shallow sliding roof and/or sliding and tilting roof to be obtained. As a safety device, with the invention, at least one flexible safety element is additionally provided which reliably holds the cover on the motor vehicle, even in case of an accident, but at the same time does not impede the cover movements for sliding or venting. This at least one flexible safety element is constituted and designed to withstand stresses occurring in an accident, so that the cover is reliably secured against pulling out from the roof opening of the motor vehicle.

This flexible safety element can be configured in various ways. For example, it can consist of tough plastic fibers and be designed as a strap or belt, hose, sling, rope or cloth. Alternately, this flexible safety element can also be formed by a metal part.

So as not to impede the cover movements in sliding and/or venting movements of the cover, and also to avoid noises caused by vibrations of the flexible safety element in the closed condition of the cover, the flexible safety element is kept in the stretched, i.e., taut, condition in its nonuse position. In this case, an intrinsic elasticity can be imparted to the flexible safety element, so that it is held in the stretched condition in its nonuse position. Alternatively, a spring element can also be provided to hold the flexible safety element in a stretched condition in its the nonuse position.

The flexible safety element can be fastened to the sliding device or to the guide rail or to the vent device, if such is provided, or to the roof frame. Depending on the location of and nature of the flexible safety element, the element is permanently connected directly or indirectly to a part which is integral with the motor vehicle body. The respective method of connecting the safety device to the part integral with the motor vehicle body depends especially on the basic type of roof, i.e., a sliding roof and/or sliding and tilting roof as well as on the respective space conditions.

According to a advantageous configuration, the cover-side end of the flexible safety element is not fixed to the cover but is loosely mounted on it. For this purpose, for example, a sheet metal holding strap can be provided on the cover, through which the flexible safety element passes and is run on the cover. In such a loose mounting on the cover, the flexible safety element advantageously stretches over the entire movement path of the cover in the cover longitudinal direction at both longitudinally extending sides of the cover. In this way, the cover is secured and held on the motor vehicle with two flexible safety elements running in the cover longitudinal direction, so that even in the case of failure of one of the flexible safety elements, there is still an additional safety against a pulling out of the cover from the roof opening.

If, according to an embodiment of the invention, the flexible safety element is designed of cloth and extends, for example, in the cover longitudinal direction, it acts at the same time as a masking screen which conceals the sliding device and/or the adjusting device as well as related parts of the roof.

According to another embodiment of the invention, the end of the flexible safety element connected to an integral part of the motor vehicle body is guided in a sliding manner in the guide rail. With this configuration, the flexible safety element is carried along and guided along in the cover movements, so that it is not visible even with the cover opened or partially opened.

For such a slidable guiding of the integrally connected end of the flexible safety element on the guide rail, it can, for example, be permanently connected to the rigid drive cable of the sliding device. On the other hand, the integrally connected end can be guided in the guide rail by a slide or sliding block. A separate guide channel can be additionally provided to guide this slide in the guide rail. Alternatively, the slide can be guided in an idle channel in the guide rail, i.e., a channel in the guide rail in which no rigid drive cable is located.

Preferably, in the case of this slidable guidance of the integrally connected end of the flexible safety element in the guide rail with the help of a slide, the safety element is connected to a front cover guide, so that the flexible safety element and the respective slide basically move with the same sliding speed as the cover in order not to obstruct the sliding movement of the cover.

Another advantageous embodiment according to the invention integrates the flexible safety element into a part of the sliding roof and/or sliding and tilting roof that works together with the cover and the guide rail. In this case, the flexible safety element can be designed as a steel rope or cable and can be cast, pressed or molded into the part which works together with the cover and guide rail. In this case the flexible safety element serves as an additional stiffening device, without additional components needing to be provided on the roof. It has turned out to be particularly suitable to incorporate the flexible safety element in the venting lever of the vent device and sliding device of a sliding and tilting roof.

The preferred embodiments of the invention are explained in greater detail below with reference to the accompanying drawings, and from which further objects, features and advantages of the invention will become apparent.

BRIEF DESCRIPTION OF THE DRAWINGS

In the figures of the drawing, the same or similar parts are provided with the same reference symbols, with prime (') symbols used to distinguish these parts between the embodiments.

DETAILED DESCRIPTION OF THE PREFERRED EMBODIMENTS

Figure 1:
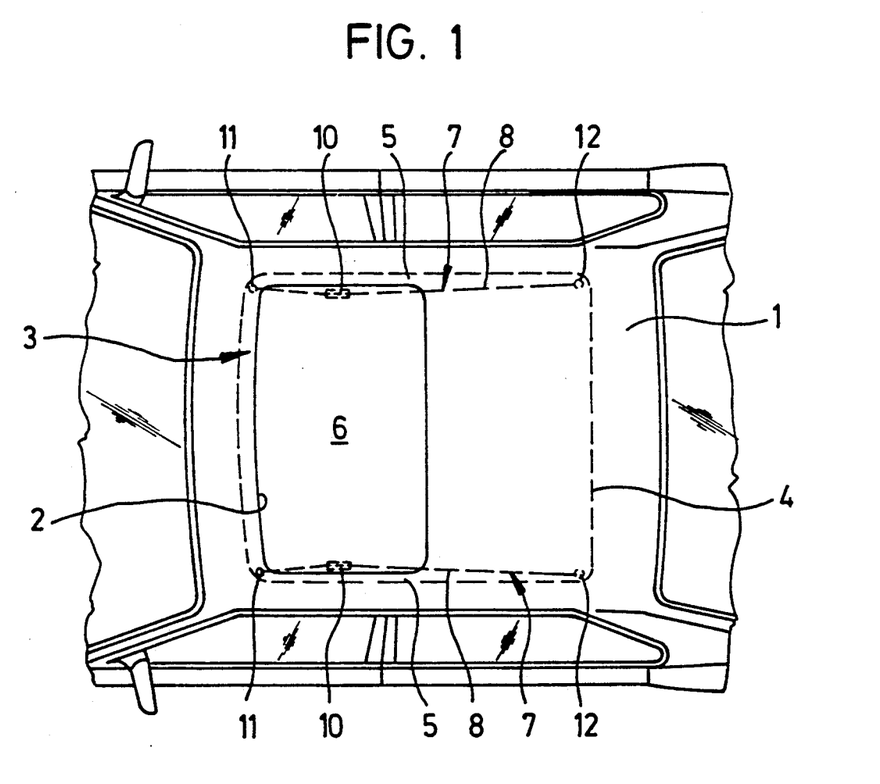
FIG. 1 is a diagrammatic top view of a motor vehicle roof with a sliding roof and/or sliding and tilting roof with a diagrammatically indicated flexible safety element.

In the top view of a motor vehicle according to FIG. 1, the fixed roof surface of the motor vehicle is designated by 1. A sliding roof or sliding and tilting roof, designated as a whole by 3, is incorporated in a roof opening 2 cut in a fixed roof surface 1. Sliding roof or sliding and tilting roof 3 has a roof frame 4 which is incorporated into roof opening 2. Roof frame 4 has lateral guide rails 5 running in the vehicle longitudinal direction. A sliding device and a vent device that are driven by at least one rigid operating cable (not shown in FIG. 1) are used to displace a rigid cover 6 of the sliding or sliding and tilting roof 3, so that the roof opening 2 can be completely closed, at least partially unblocked and optionally be vented. In FIG. 1, a safety device 7, for protecting against detachment of cover 6 from the motor vehicle, is diagrammatically represented as having a flexible safety element 8 on each longitudinal side of sliding roof 3. The flexible safety element 8 is designed in the form of a catch band which is connected to cover 6 and either directly or indirectly to an integral part of the motor vehicle body.

Figure 2A:
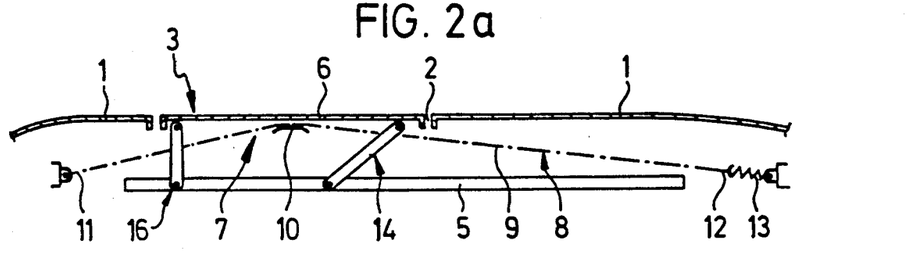
FIG. 2(a) is a diagrammatic side view of a sliding and tilting roof for motor vehicles with a first embodiment of a safety element according to the invention.
Figure 2B:
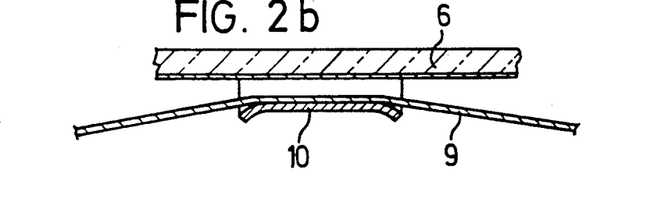
FIG. 2(b) is an enlarged view of the encircled detail in FIG. 2(a) illustrating the loose mounting of the flexible safety element on the cover of the roof.

A first preferred embodiment of safety device 7, shown diagrammatically in FIG. 1, is explained with reference to FIGS. 2(a) to 2(e). As illustrated in FIG. 2(a), which shows a sliding and tilting roof 3 with cover 6 closed, and FIG. 2(b) which is a view of the encircled detail of FIG. 2a, flexible safety element 8 is formed by a catch band 9. On each side of sliding lifting roof 3, a sheet metal holding strap 10 is attached on the bottom side of the cover 6, and catch band 9 is loosely run through this holding strap 10 and, thus, held on cover 6. One end of catch band 9, designated by 11, is fastened in the front to roof frame 4. The other end of catch band 9, designed by 12, is also fastened to the frame. The catch band 9 is put under initial tension at the fastening point of end 12 on roof frame 4 by a diagrammatically indicated spring 13, so that it is in a stretched condition in each position of cover 6 to avoid obstructing movement of the cover of sliding and tilting roof 3. A vent device 14 for the sliding and tilting roof has a diagrammatically indicated vent lever and a sliding device 16 for movement of cover 6 which are guided in guide rail 5. Since this vent device 14 and sliding device 16 are devices known in the art, the details of their construction and manner of operation need not be discussed in greater detail, and thus, are omitted for brevity.

Figure 2C:
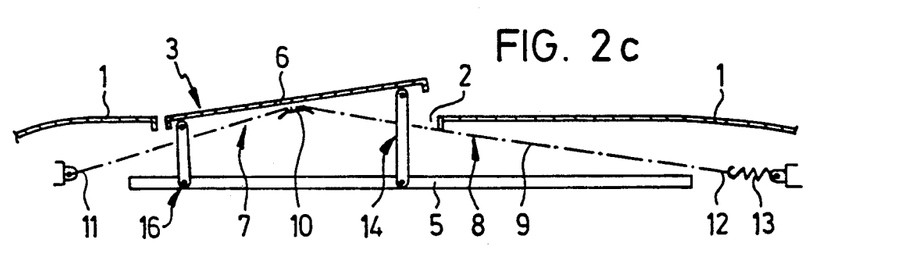
FIGS. 2(c)–2(e) are diagrammatic side views of the sliding lifting roof according to FIG. 2(a) with the cover vented, the cover unblocking the roof opening and with a broken vent device of the sliding and tilting roof, respectively.
Figure 2D:
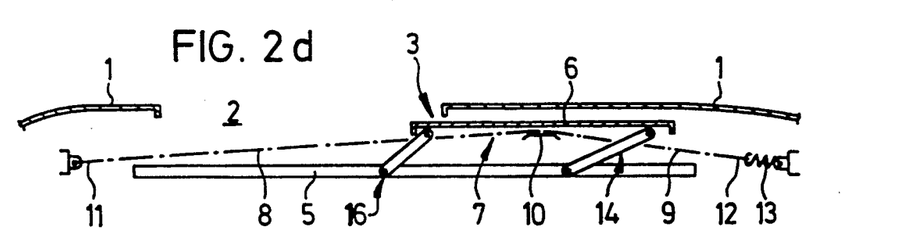
Figure 2E:
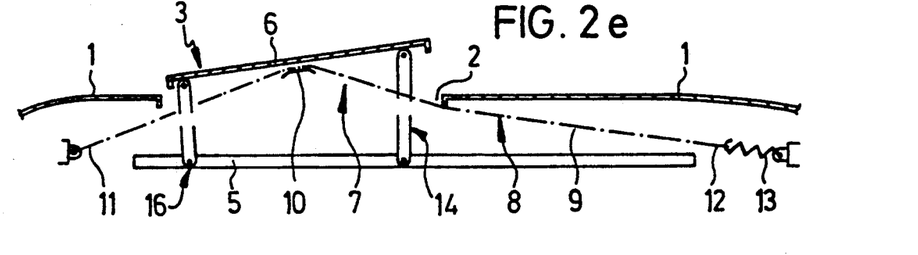

Cover 6 is connected, in each position, to roof frame 4, which is a part that is integral with the motor vehicle body, by catch band 9. FIGS. 2(c) and 2(d) show cover 6 of sliding and tilting roof 3 in the vented position (FIG. 2(c)) and in that position (FIG. 2(d)) in which roof opening 2 is completely unblocked by cover 6 having been retracted under fixed roof surface 1. It can be seen from these figures that the movements of cover 6, performed with vent device 14 and sliding device 16, is not hindered by the safety device in the form of flexible catch band 9, since catch band 9 is loosely run and held on the underside of cover 6 with the help of sheet metal holding strap 10. However, if vent device 14 and sliding device 16 fail, as represented in FIG. 2(e), cover 6 cannot be pulled out of roof opening 2, since it is held on the motor vehicle thanks to the safety device formed by catch band 9.

Figure 3:
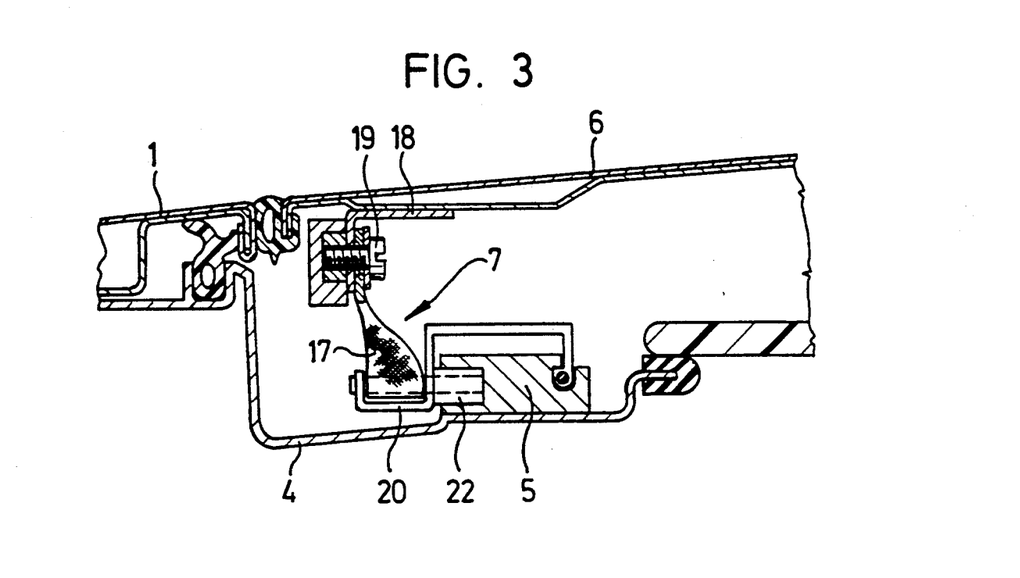
FIG. 3 is a diagrammatic sectional view of a modified embodiment of a safety device.

FIG. 3 is a cross-sectional view of a modified embodiment of a safety device according to the invention. Here, again, a catch band, designated as 17, is provided as a flexible safety element. However, in a departure from the embodiment according to FIGS. 2(a) to (2e), the catch band 17 of safety device 7' is indirectly fastened to a part that is integral with the motor vehicle body. One end of catch band 17 is fastened on a cover support bracket 18, to which cover 6 is fastened. For this purpose, in FIG. 3, a screw fastening 19 is shown. Guide rail 5 is fastened on roof frame 4. As part of a vent or sliding device, a carriage 20 is shown in FIG. 3 which is slidably guided in guide rail 5. The opposite end of catch band 17 from that connected to the cover is fastened to carriage 20 of the vent device or sliding device. Since guide rail 5 is permanently connected to roof frame 4, catch band 17 is indirectly connected to this part which is integral with the roof frame 4 of the motor vehicle body. Of course, catch band 17 in FIG. 3 is dimensioned to be long enough not to interfere with the venting movement of cover 6. Advantageously, catch band 17 has a certain intrinsic elasticity so that it can go along in the venting movement of cover 6 without a great expenditure of energy.

Figure 4A:
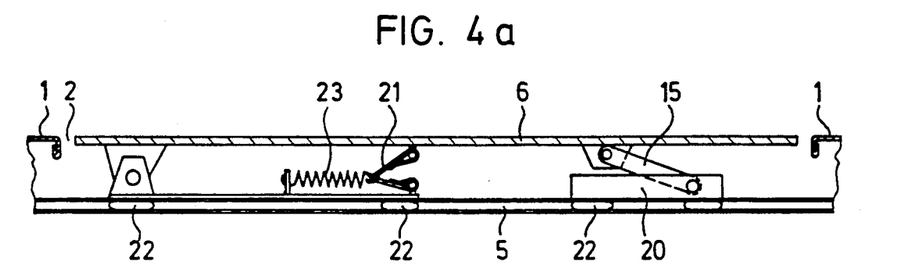
FIG. 4(a) is a diagrammatic view of a sliding and tilting roof with another embodiment of a safety device according to the invention.
Figure 4B:
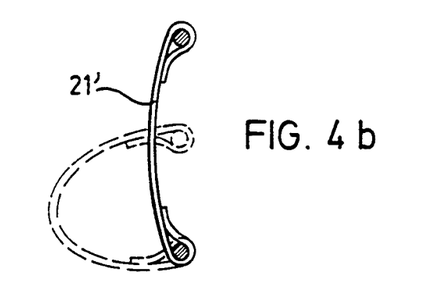
FIG. 4(b) is a diagrammatic detail representation of the safety device according to FIG. 4(a), which is designed as a catch strap.
Figure 4C:
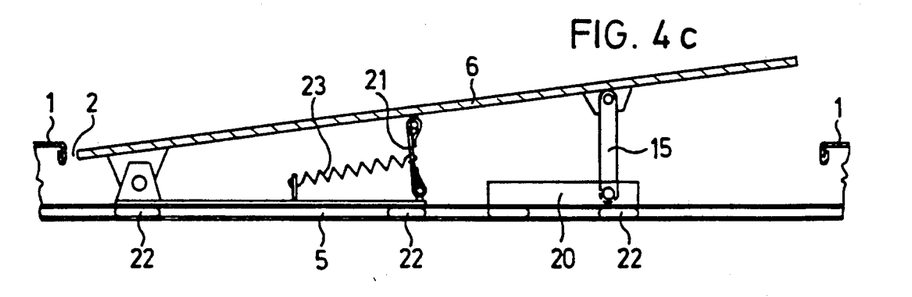
FIG. 4(c) is a diagrammatic view of the sliding lifting roof corresponding to FIG. 4(a) with the cover vented.

Another embodiment of a safety device for preventing a detachment of cover 6 from the motor vehicle is explained in FIGS. 4(a) to 4(c). Here, a catch band 21 is provided which, on the one hand, is fastened to cover 6 and, on the other hand, to guide rail 5 (which is a part that is integral with the motor vehicle body) at a point which is between carriage 20 of the sliding device and/or vent device and a front slide block 22 of cover 6. Front slide block 22, like carriage 20, is guided in guide rail 5.

As can be seen from FIG. 4(c), in which cover 6 is in the vented position, in comparison with FIG. 4(a), which shows cover 6 in its closed position, only a relatively small relative movement occurs between carriage 20 and cover 6 in performing the venting movement of cover 6. Therefore, catch band 21 can be dimensioned relatively short and a spring 23 suitably provided, which engages at one end approximately in the center of catch band 21 and, at an opposite end, is fastened to guide rail 5. With the help of this spring 23, catch band 21 can be stretched and kept taut both in the vent position of the cover (FIG. 4(c)) and in the closed position of cover 6 (FIG. 4(a)), so that noises from sagging of catch band 21 can be avoided. As reflected in FIG. 4(b), catch band 21 can, alternatively, be formed with a textile band 21', which has a certain inherent elasticity and dimensional stability. In such a case, spring 23, shown in FIG. 4(a) and 4(c), can be eliminated.

Figure 5:
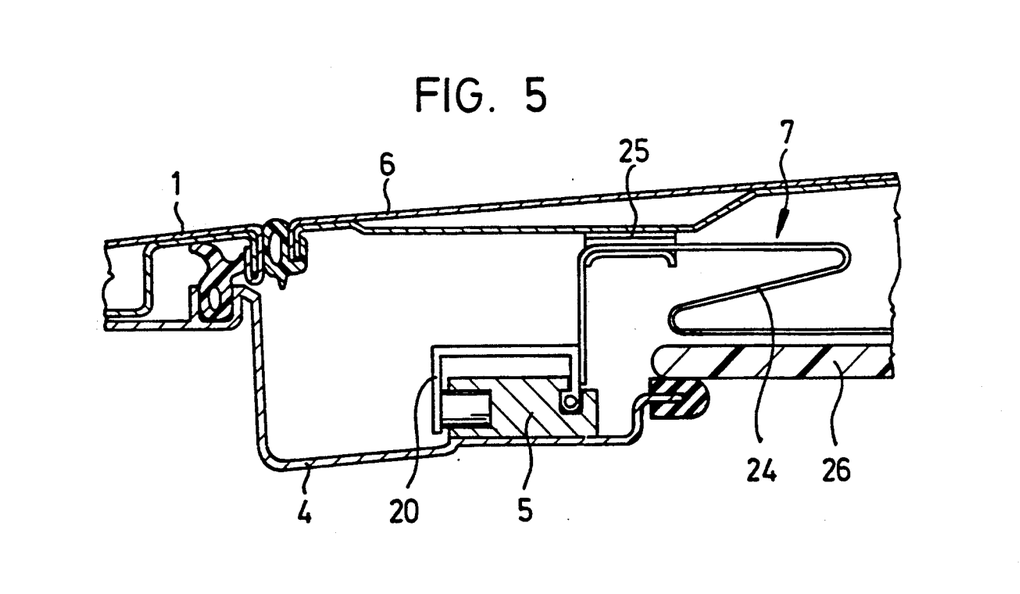
FIG. 5 is a diagrammatic side view of a sliding and tilting roof with a catch cloth as flexible safety element which, at the same time, serves as a masking screen.

In the safety device 7" according to FIG. 5, a catch cloth 24 is used as flexible safety element. Cloth 24 passes through a sheet metal holding strap 25 carried by the cover 6 at each lateral side and its ends are attached to a respective guide rail 5 via, for example, carriage 20. This catch cloth 24 is constituted and designed so that by initial stress, applied, for example, by a spring (not shown), or its inherent elasticity, it allows an unhindered venting movement of cover 6. Since catch cloth 24 is moved with each carriage 20 on guide rail 5, catch cloth 24 is carried along the cover conveying movement of carriage 20. Catch cloth 24 is placed in the area between cover 6 and a movable headliner 26, and at the same time, acts as a masking screen by which the parts of the mechanism of the sliding lifting roof, in each position of cover 6, are concealed.

Figure 6A:
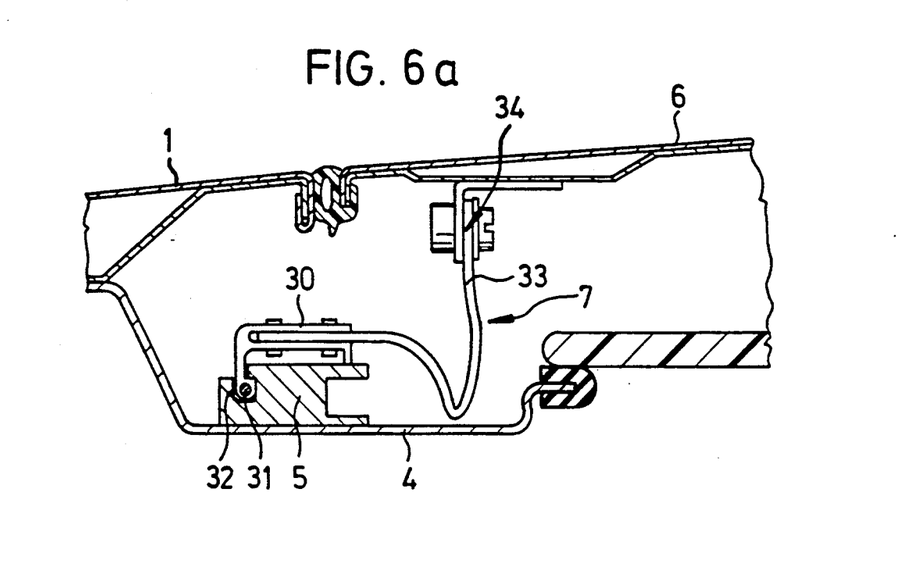
FIGS. 6(a) and 6(b) are diagrammatic side views of a sliding. and tilting roof illustrating yet another embodiment of a safety element according to the invention.
Figure 6B:
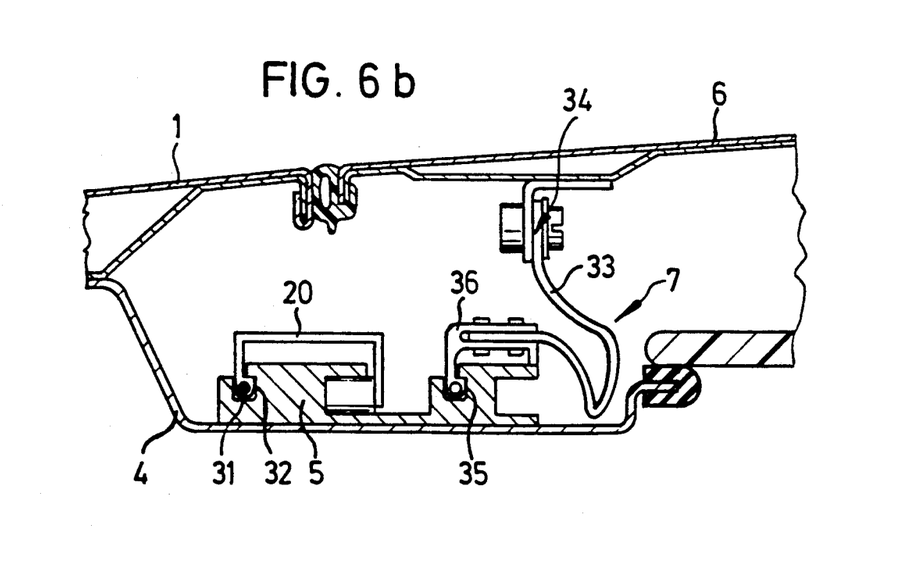

FIGS. 6(a) and 6(b) show a further embodiment of a safety device 7''' for preventing detachment of cover 6 from the motor vehicle. In FIG. 6(a), a slider 30 is shown, which for example, is an extruded profile part. This slider 30 is fastened to rigid drive cable 31 and is guided in an allocated cable channel 32 in guide rail 5. One end of flexible safety element 33 is incorporated in slider 30 and fastened there. The other end of flexible safety element 33 is connected to a front cover point 34 or the front cover guide in a manner permitting relative rotation between the cover and safety element 33. If double channels are present in the guide rail for the rigid drive cable, slider 30 can be guided in an unused channel of each guide rail 5 without being connected to the rigid drive cable.

In the variation according to FIG. 6(b), a separate channel 35 is made, in guide rail 5, in which a slide block 36, that is similar to slider 30, engages and to which one end of flexible safety element 33 is fastened. The other end of flexible safety element 33, as in FIG. 6(a), is permanently fastened to cover 6 or its fastening mount in a manner permitting relative rotation therebetween. Carriage 20 of the sliding device and vent device is shown diagrammatically in FIG. 6(b) on the left side of guide rail 5. The slide block 36 of flexible safety element 33, for example, is connected to the front cover guide or its slide block (not shown), so that an equal sliding rate is obtained relative to cover 6.

Figure 7A:
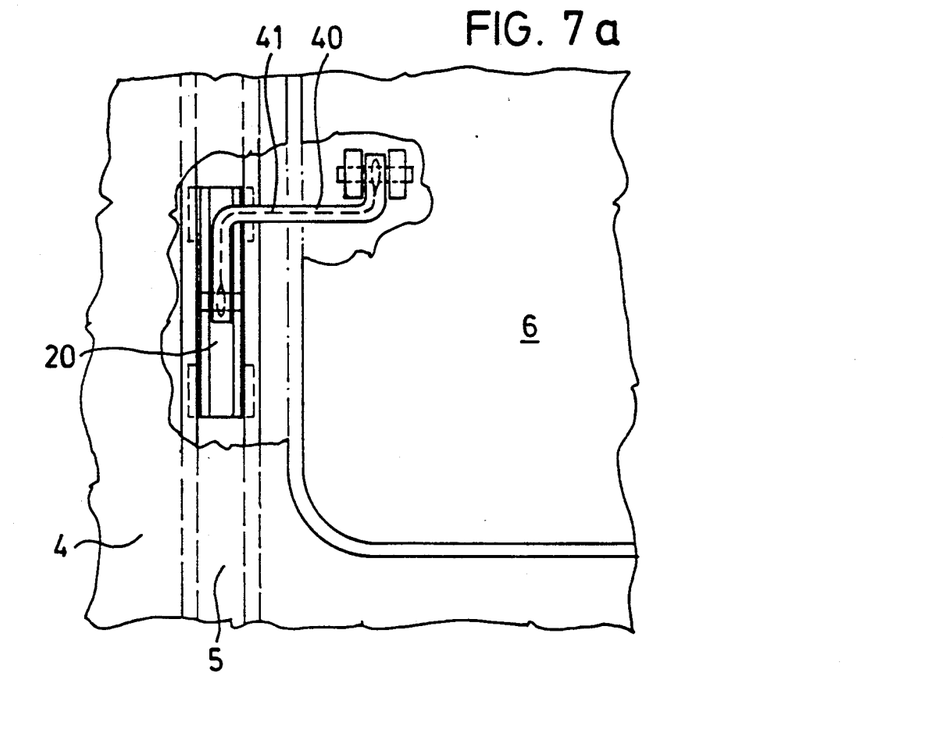
FIGS. 7(a) & 7(b) are diagrammatic views which illustrate still another preferred embodiment of a safety device according to the invention which is integrated into the vent device and/or sliding device.
Figure 7B:
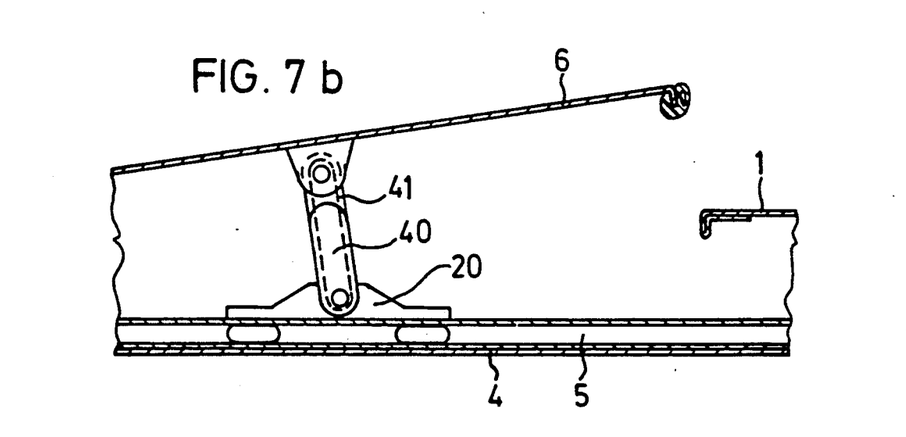
Figure 8:
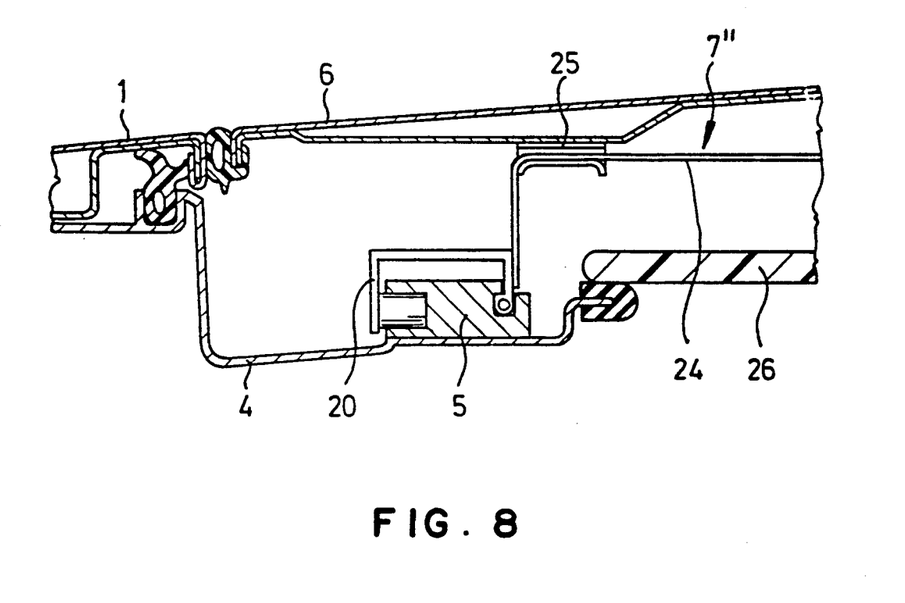
FIG. 8 is a view a modification of the FIG. 5 embodiment in which the catch cloth is in a stretched state in its inactive condition.

FIGS. 7(a) and 7(b) show another preferred embodiment of a safety device according to the invention. As shown in FIG. 7(a), guide rail 5 is fastened to fixed roof surface 1. A carriage 20, on which vent lever 40 for cover 6 of sliding lifting roof 3 pivots, is guided in the corresponding guide channels in the usual way. Vent lever 40 is a cast component, into which is incorporated the safety device for preventing detachment of cover 6 from the motor vehicle. According to FIG. 7(b), the safety device that is integrated into vent lever 40 uses a safety element in the form of a steel rope 41. The flexible safety element, for example, in the form of steel rope 41, can be cast, pressed or molded into the vent lever 40 or another part of the vent device and/or of the sliding device.

Quite generally, it is still to be noted that the flexible safety element in the embodiments explained above can be made as a band or belt, hose, sling, rope or cloth of tough plastic fibers or as metal part. In its inactive condition (i.e., when not actively preventing separation of the cover as contrasted with its FIG. 2e condition), the flexible safety element is suitably held in a stretched condition by its inherent elasticity. All the above-described embodiments of the safety device are based on the fundamental idea to connect cover 6 directly or indirectly by a flexible safety element to a part that is integral with the motor vehicle body; wherein a distance between a first end of said safety device, at which the safety device is connected to the part which is integral with the motor vehicle body, and a second end of the safety device, at which it is connected to the cover, is variable to an extent which is just sufficient to accommodate required operational movements of the cover in a vertical direction as the cover is displaced between said positions closing and at least partially opening the roof opening. By this design, it is achieved that the flexible safety element, in the movement of cover 6, especially in its lifting movement during venting, goes along without a notable resistance to movement being made. Also the sliding movement of cover 6 is not impaired. Further, the safety device for preventing detachment of the cover from the motor vehicle according to the invention comes into action only if the mechanical parts of sliding roof and/or sliding lifting roof 3 are overstressed or broken. The flexible safety element of the safety device according to the invention in case of stress is stressed only under tension, and therefore, can be designed so that it is highly capable of bearing a tensile load.

While various embodiments in accordance with the present invention have been disclosed, those skilled in the art will recognize that they are subject to numerous modifications and variations, and that other embodiments can be utilized as well, all without departing from the concepts underlying the present invention. Thus, this invention should not be viewed as being limited to the disclosed embodiments or any specific features thereof, and it is intended that it encompass the full extent of the appended claims.

We claim:

1. Roof for vehicles of the type having a rigid cover that is displaceable between positions closing and at least partially unblocking a roof opening in a fixed roof structure of a vehicle body, and a displacement mechanism coupled between the fixed roof structure and the cover for displacing the cover by at least a sliding device on a guide rail; wherein a safety device is provided as a means for preventing detachment of the cover from the motor vehicle, said safety device being separate and distinct from said displacement mechanism and having at least one flexible safety element in the form of an elongated structure selected from the group consisting of a band, belt, hose, sling, rope and cloth; wherein each of opposite ends of the elongated structure are connected to the fixed roof structure of the vehicle body and an intermediate portion of the elongated structure traverse a cover dimension beneath an outer surface thereof and is coupled to the cover in a relatively displaceable manner via a coupling member that is connected the cover; and wherein the safety device has a length between opposite ends thereof that is variable to an extent which is just sufficient to accommodate required operational movements of the cover in a vertical direction as the cover is displaced between said positions closing and at least partially unblocking the roof opening.

2. Roof according to claim 1, wherein the flexible safety element is made of tough plastic fibers.

3. Roof according to claim 1, wherein the flexible safety element is made of a metal part.

4. Roof according to claim 1, wherein, when in an inactive condition, the flexible safety element is in a stretched state due to an inherent elasticity thereof.

5. Roof according to claim 1, wherein, when in an inactive condition, the flexible safety element is held in a stretched state by a spring element.

6. Roof according to claim 1, wherein one of said ends of the flexible safety element is connected to a said sliding device.

7. Roof according to claim 1, wherein at least one of said ends of the flexible safety element is connected to a roof frame bordering the roof opening.

8. Roof according to claim 1, wherein said flexible safety element is mounted on the cover so as to be slidably displaceable relative thereto.

9. Roof according to claim 8, wherein the flexible safety element comprises a cloth which serves, at the same time, as a masking screen.

10. Roof according to claim 1, wherein at least one of said ends of the flexible safety element is slidably guided in a said guide rail.

11. Roof according to claim 10, wherein said at least one of said ends of the flexible safety element which is slidably guided in a said guide rail is guided by a slider.

12. Roof according to claim 11, wherein the slider is guided in a separate guide channel in the guide rail from that in which a drive cable of a drive for displacing the cover is located.

13. Roof according to claim 11, wherein the slider is connected to a front cover guide.

14. Roof according to claim 1, wherein at least one of said ends of the flexible safety element is permanently connected to a drive cable of a driving sliding device.

15. Roof according to claim 1, wherein the coupling member is a sheet metal holding strap which permits free relative movement of the safety element along the cover.

* * * * *